United States Patent
Fitzgerald

(10) Patent No.: US 7,095,759 B1
(45) Date of Patent: Aug. 22, 2006

(54) COMBINED TELEPHONE PBX AND COMPUTER DATA ROUTER WITH POOLED RESOURCES

(75) Inventor: Jeffrey Fitzgerald, Amherst, NH (US)

(73) Assignee: AT Comm Corporation, San Mateo, CA (US)

( * ) Notice: Subject to any disclaimer, the term of this patent is extended or adjusted under 35 U.S.C. 154(b) by 0 days.

(21) Appl. No.: 09/527,968

(22) Filed: Mar. 17, 2000

Related U.S. Application Data

(60) Provisional application No. 60/125,347, filed on Mar. 19, 1999.

(51) Int. Cl.
*H04J 3/02* (2006.01)

(52) U.S. Cl. .................... 370/538; 370/468; 370/352

(58) Field of Classification Search ............... 370/352, 370/353, 354, 468
See application file for complete search history.

(56) References Cited

U.S. PATENT DOCUMENTS

| | | | |
|---|---|---|---|
| 5,631,906 A | | 5/1997 | Liu |
| 5,673,253 A | * | 9/1997 | Shaffer ..................... 370/229 |
| 5,745,487 A | | 4/1998 | Hamaki |
| 5,796,740 A | | 8/1998 | Perlman et al. ............ 370/401 |
| 5,812,533 A | | 9/1998 | Cox ........................... 370/259 |
| 5,825,779 A | * | 10/1998 | Putnins ..................... 370/477 |
| 5,884,064 A | | 3/1999 | Rosenberg |
| 5,946,323 A | * | 8/1999 | Eakins et al. ............... 370/468 |
| 5,953,338 A | * | 9/1999 | Ma et al. ................ 370/395.21 |
| 6,026,086 A | | 2/2000 | Lancelot ..................... 370/353 |
| 6,347,088 B1 | * | 2/2002 | Katou et al. ............ 370/395.2 |
| 6,424,646 B1 | * | 7/2002 | Gerszberg et al. .......... 370/352 |
| 6,594,265 B1 | * | 7/2003 | Etorre et al. ........... 370/395.51 |
| 6,671,262 B1 | * | 12/2003 | Kung et al. ................. 370/260 |
| 6,683,877 B1 | * | 1/2004 | Gibbs et al. ............. 370/395.2 |

OTHER PUBLICATIONS

"Customized Bandwidth" by Monua Janah with Mary E. Thyfault and Beth Davis, published in "Information Week" May 11, 1998 pp. 18 to 20.
"Delivering Value-Added Services Business Class VPN solutions" Copyright: 1998 Newbridge Networks Corporation Printed in Canada 97-2900-01-00-A.
"Carrier Switch Routing solution Sheet" Copyright 1999 Newbridge Networks Corporation.

* cited by examiner

*Primary Examiner*—Doris H. To
*Assistant Examiner*—Thien Tran
(74) *Attorney, Agent, or Firm*—Marger Johnson & McCollom, P.C.

(57) ABSTRACT

System resources are pooled and allocated in an optimal manner to handling telephone voice traffic or to handling computer data traffic. A combination of mechanisms is used to achieve higher statistical multiplexing on a network interface by dynamically adjusting the multiplexing. The system: 1) Provides homogeneous access to DS0 trunk resource by both voice and data traffic, resulting in a larger resource pool. 2) Partially normalizes the class of service characteristics of data traffic to make it more predictable and can dynamically adjust the bandwidth such that requests for resources can be honored with a higher success rate, and 3) Maintains multiple qualities of service for multiple voice and data streams drawing from a single resource pool. Data traffic is normalized into flows, each of which has an assigned priority and bandwidth is allocation to each of the flows.

2 Claims, 8 Drawing Sheets

COMBINED TELEPHONE PBX AND COMPUTER DATA ROUTER WITH POOLED RESOURCES

CROSS REFERENCE TO RELATED APPLICATIONS

The present application is a continuation of application 60/125,347 filed Mar. 19, 1999 which was pending on the filing date of the present application.

FIELD OF THE INVENTION

The present invention relates to communication systems and more particularly to PBXs (private branch exchanges) for telephone circuits and to LANs (local area networks) and WANs (wide area networks) for data transmission.

BACKGROUND OF THE INVENTION

Most present day offices include telephones and computers. Office suites generally have a PBX or key system to handle the telephones and a separate Data Router to interconnect computers via a LAN.

Telephone key systems and PBX systems are available in a wide variety of forms. Most such systems are built using special purpose hardware. However, recently, programmed personal computers have been used to implement telephone switching systems. Such systems use the multitasking capabilities of computers such a the Microsoft Windows NT system to simultaneously switch a number of telephone calls between local loops and from local loops to trunk circuits.

The LANs used in office suites generally interconnect computers through Data Routers. A number of companies including Cisco Systems Inc., and AT&T market Routers for LAN networks.

In general, telephone systems and computer networks are moving toward similar technologies. This movement has been accelerated by the advent of "Internet Telephony". Internet Telephones transmit digitized and packetized voice over computer LAN networks and over the Internet.

Recently, systems have become available which integrate in one unit both, telephone switching or PBX capabilities, and LAN Data Routing or switching capabilities. Such integrated systems can function as both a small PBX and as a LAN Data Router. Presently available integrated systems use the multitasking capabilities of computer systems (such as the multitasking capabilities of the Microsoft Windows NT system) to handle multiple tasks on a time slice basis. Such systems can both switch telephone lines and they can also route data packets traveling over a LAN network.

Recurring cost for wide area network links dominates the overall service cost when providing either telephone or data communication networks. Because of this significant value is provided by equipment that can achieve higher wide area network utilization rates.

SUMMARY OF THE PRESENT INVENTION

The present invention does not merely "integrate" the functions of a telephone switch and the functions of a LAN router in one unit. The present invention "pools" resources and allocates them in an optimal manner to either the task of handling telephone voice traffic or to the task of handling computer data traffic. By pooling resources the present invention makes optimal use of the available resources.

The present invention also provides a modular system that can be expanded easily and which can meet the needs of a variety of office environments. The present invention utilizes a combination of mechanisms to achieve higher statistical multiplexing on a network interface by dynamically adjusting the multiplexing. The present invention:

1) Provides homogeneous access to DS0 trunk resource by both voice and data traffic, resulting in a larger resource pool.
2) Partially normalizes the class of service characteristics of data traffic to make it more predictable and can dynamically adjust the bandwidth such that requests for resources can be honored with a higher success rate, and
3) Maintains multiple qualities of service for multiple voice and data streams drawing from a single resource pool.

With the present invention data traffic is normalized into flows, each of which has an assigned priority. Bandwidth is allocation to each of the flows. Filtering is performed on lower priority flows if there is not sufficient bandwidth available to handle all the requests for service. The bandwidth of each flow is continuously monitored and the bandwidth allocation is periodically adjusted according to the assigned priority to accommodate the magnitude of the requests for service and the resources available. Voice traffic is also characterized as belonging to prioritized flows, though no filtering or bandwidth adjustment function are applied to voice traffic because voice traffic has a constant bandwidth.

Statistical multiplexing techniques have long been used in telephony networks to achieve higher wide area network utilization. However, such methods have been limited by several obstacles. Among the obstacles is the fact that the mechanisms used to determine the maximum multiplexing rate have been limited by a common class of service for all sources and destination. Another obstacle is the fact that only true telephony traffic, that is voice calls, are applied to the multiplexing function. Still another obstacle has been the fact that there is no ability to adapt the multiplexing rate dynamically as a function of load by class of service.

The present invention achieves higher statistical multiplexing achieved by;

1) Combining different classes of service into a single, larger resource pool.
2) Dynamically adjusting both the offered load and the bandwidth available by class of service.
3) Defining multiple {source, destination} multiplexing subgroups with different classes of service, within the larger resource pool, to achieve different multiplexing rates by class of service within the overall system.

DESCRIPTION OF PREFERRED EMBODIMENTS

Figure 1:
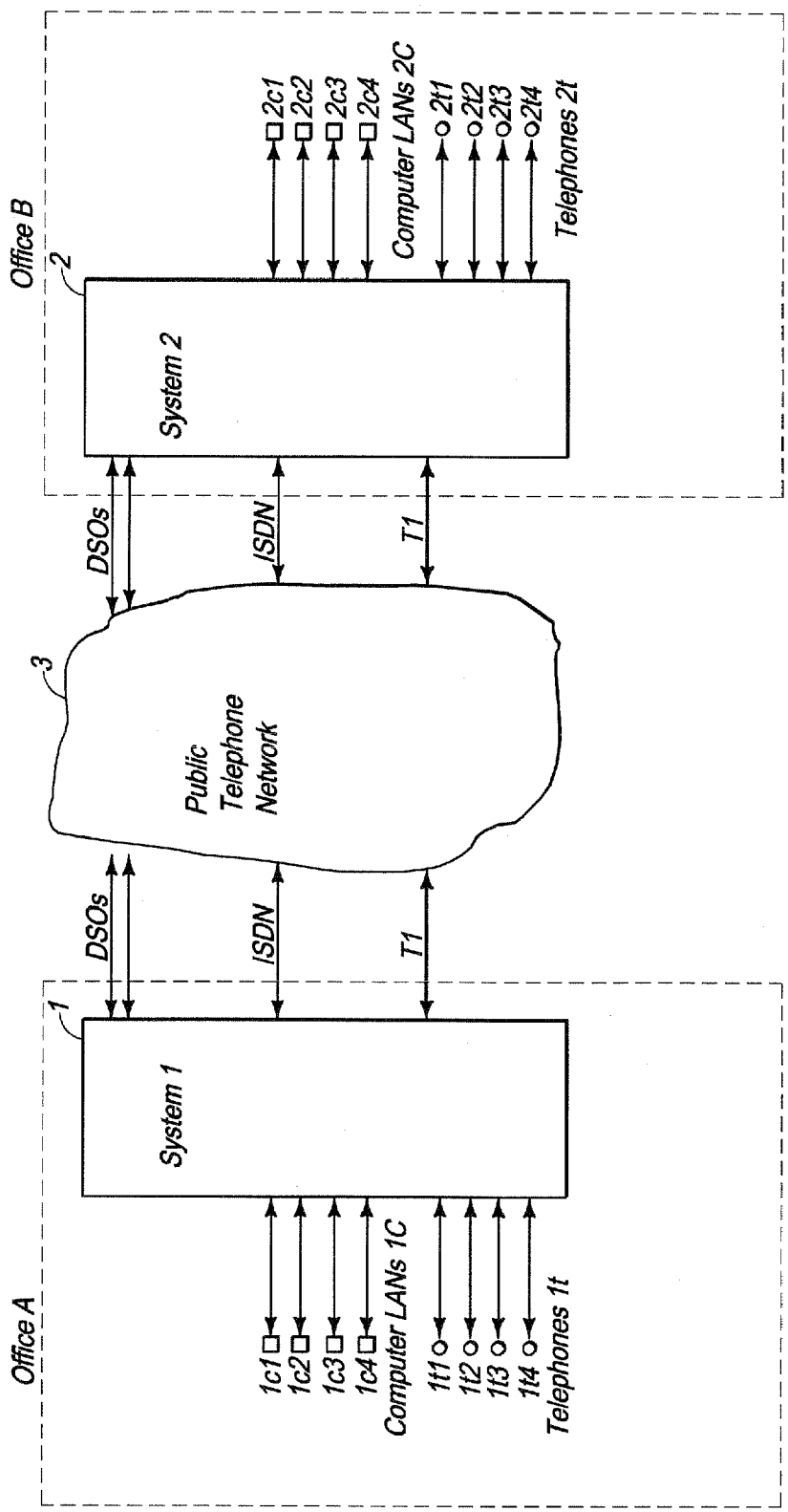
FIG. 1 is an overall diagram of the system.

FIG. 1 shows two offices designated A and B. Office A has a communication system 1 and office B has a communication system 2. Communication systems 1 and 2 are interconnected through the Public Telephone Network 3.

A number of telephones 1t1 to 1t4 (collectively referred to as 1t) and a number of computer LANs 1c1 to 1c4 (collectively referred to as 1c) for computer data traffic are connected to system 1. A number of telephones 2t and a number of computer LANs 2c are connected to system 2. The number of telephones and the number of computer LANs shown is merely illustrative and a system can have many more such telephones and LANs as explained in detail later. Systems 1 and 2 are interconnected using a number of different types of connections. There are DS0 connections (i.e. normal telephone lines), there is an ISDN (Integrated Services Digital Network) line and there is a T1 telephone connection which includes 20 DS0 circuits. Only two interconnected systems are shown in FIG. 1; however, communication system 1 and 2, could be connected to several different systems at the same time through public network 3 and possibly through other private WANs (Wide Area Networks).

The amount of traffic between systems 1 and 2 at any time depends on the number of telephones in use and the amount of data traffic provided by LANs 1c and 2c at that time. Sometimes there may be a great deal of computer data traffic between systems 1 and 2, and other times there may be many telephone calls between the systems. Some of the telephones have a higher priority relative to system usage than do other telephones and some of the computer traffic has a higher priority than does other computer traffic.

The present invention pools the resources for transmitting telephone and data traffic between systems 1 and 2. Each type of traffic is assigned a priority and resources are allocated in accordance with the assigned priority. Data traffic is normalized so that it can be handled and prioritized using the same pool of resources as that used by the telephone traffic. For example, at one time all the DS0 connections may be used for telephone traffic and at another time half the DS0 connections may be used for data traffic. At still another time ninety percent of the DS0s may be used for data traffic and only ten percent used for telephone traffic.

The data traffic is organized into "flows" and "sub-flows". A flow may consist of one or more sub-flows. Each sub-flow designates traffic from a particular port, with a particular protocol, and if applicable, a particular application from a particular computer. Each flow is assigned bandwidth in multiples of 64K. It is noted that 64K is the bandwidth available in one DS0 circuit. One or more sub-flows form a flow. Sub-flows can have any assigned bandwidth (including none). The total bandwidth of the sub-flows in a flow can not together have more than the bandwidth available in the flow. The total of all flows can not exceed the bandwidth of all the WAN ports (all of the DS0s combined). POartial DS0 circuits for a flow can be assigned and used if such circuits are available.

Data packets which enter the system are first classified into flows and sub-flows. That is, each packet is assigned to a sub-flow and each sub-flow is assigned to a flow. There are several bandwidth numbers associated with each flow and with each sub-flow. The bandwidth numbers assigned to each flow and each sub-flow are: (Note, in the following definitions, the term flow refers to both flows and sub-flows, unless otherwise specified):

Offered Bandwidth: The bandwidth at which the system is receiving packets that as associated with a particular flow or sub-flow.

Current Bandwidth: The output bandwidth that the system has currently assigned to a particular flow. This represents the aggregate bandwidth for the DS0s that have been assigned to this flow. The Current Bandwidth will always be between the Maximum and Minimum Bandwidth.

Maximum Bandwidth: The absolute maximum bandwidth that can be assigned to a flow. This is the highest bandwidth to which "Current Bandwidth" can be set for a particular flow.

Minimum Bandwidth: The absolute minimum bandwidth that can be assigned to a flow. Minimum Bandwidth is the counterpart of Maximum Bandwidth.

Average Bandwidth: A value between Maximum Bandwidth and Minimum Bandwidth. The system attempts to maintain the Current Bandwidth for a flow equal to the Average Bandwidth by filtering as explained below. However, if the "Offered Bandwidth" exceeds the Average Bandwidth the Current Bandwidth is increased up to the Maximum Bandwidth. If the Offered Bandwidth is less than Average Bandwidth then the Current Bandwidth will be decreased down to the 'Minimum Bandwidth'.

If the communication channels between the systems had sufficient bandwidth to handle all the demands for bandwidth from the telephones and Computer LANs connected to the system, the filtering and bandwidth adjustment aspect of the present invention would not be required. Bandwidth through the public telephone network is expensive and the present invention is designed to handle the normal situation where there are more demands for bandwidth than the communication channels have available. The present invention handles such situations in an intelligent manner rather than by merely introducing delay in a relatively random fashion as is done by many computer networks.

With the present invention, each flow has an assigned priority. For example, priorities could be assigned to the flows on the basis of a 1 to 10 scale. If, for example, there is not enough bandwidth available to handle two flows and the priority between two competing flows is 2 or greater, the higher priority flow takes precedence over the lower priority flow. The system administrator can assign the priority interactions that are desired for a particular system. The above described situation is merely an example.

Flow Filtering is one of the techniques used when the demands for connectivity exceeds the available bandwidth. If the Current Bandwidth of a flow exceeds the Average Bandwidth assigned to that flow, partial filtering is used to reduce the Current Bandwidth of the flow. If the Current Bandwidth becomes equal to the Maximum Bandwidth severe Flow Filtering is used ensure that Offered Bandwidth does not exceed Maximum Bandwidth.

As previously noted a flow can consist of several sub-flows. If possible the filtering is applied to the lower priority sub-flows within a flow so as to reduce the Current Bandwidth of the flow without affecting the higher priority sub-flows.

Figure 2:
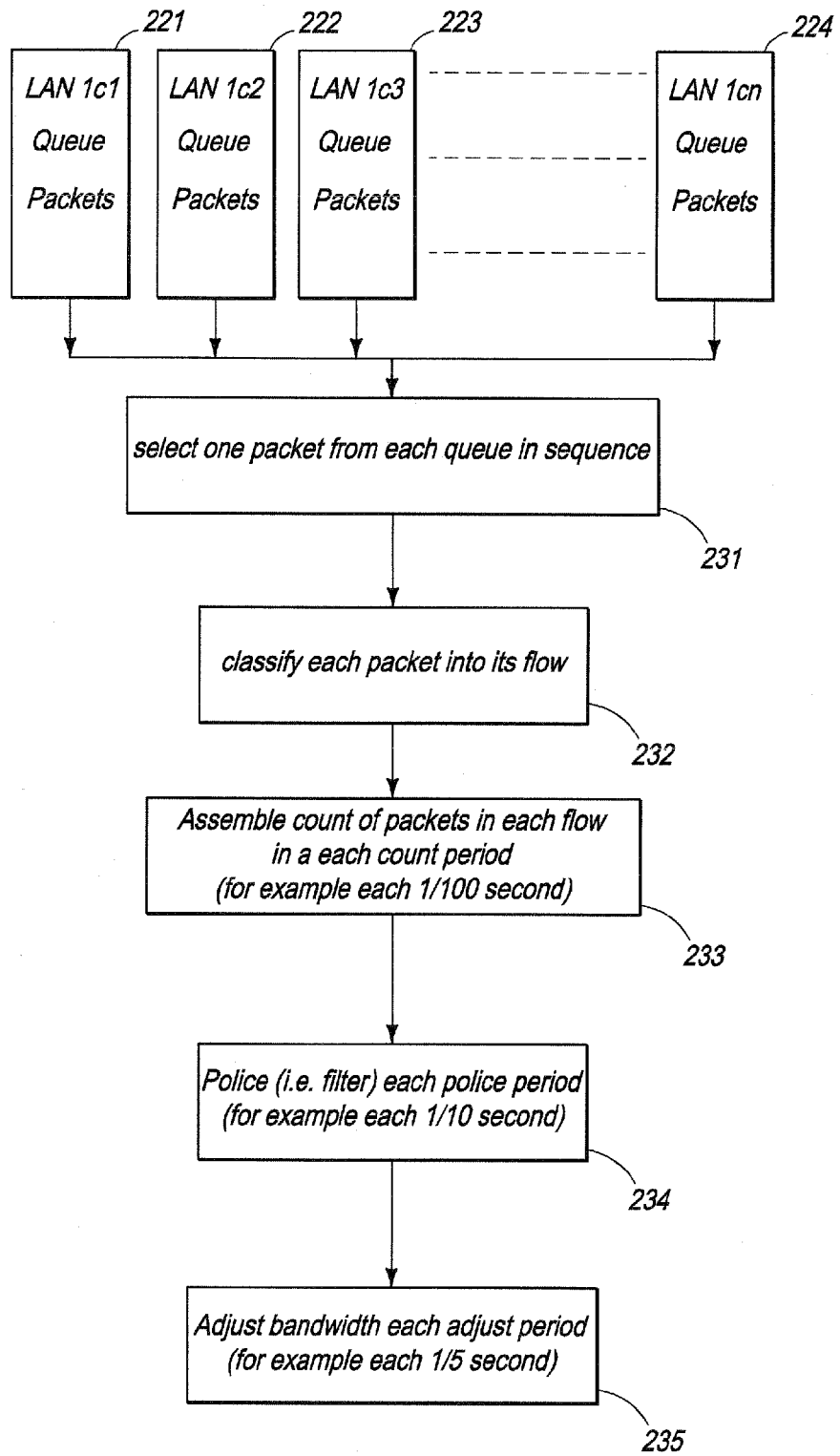
FIG. 2 is a programming flow diagram showing how data flows are handled in the system.

FIG. 2 is a program flow diagram showing the overall operation of the system with respect to data traffic. The description will be directed at system 1; however, it applies equally to system 2. As Ethernet data packets come into the system from LANs 1c1 to 1c4, they are stored in queues which are designated 221 to 224 in FIG. 2. As indicated by block 231, the system selects one packet from each queue in sequence for processing.

Each Ethernet packet is then classified into a flow as indicated by block 232. An Ethernet packet includes the following fields:
  DA Destination MAC address
  SA Source MAC address
  T/L Type or length field
  Data Upper layer protocol identification and data
  FCS Frame check Sequence.

Figure 4A:
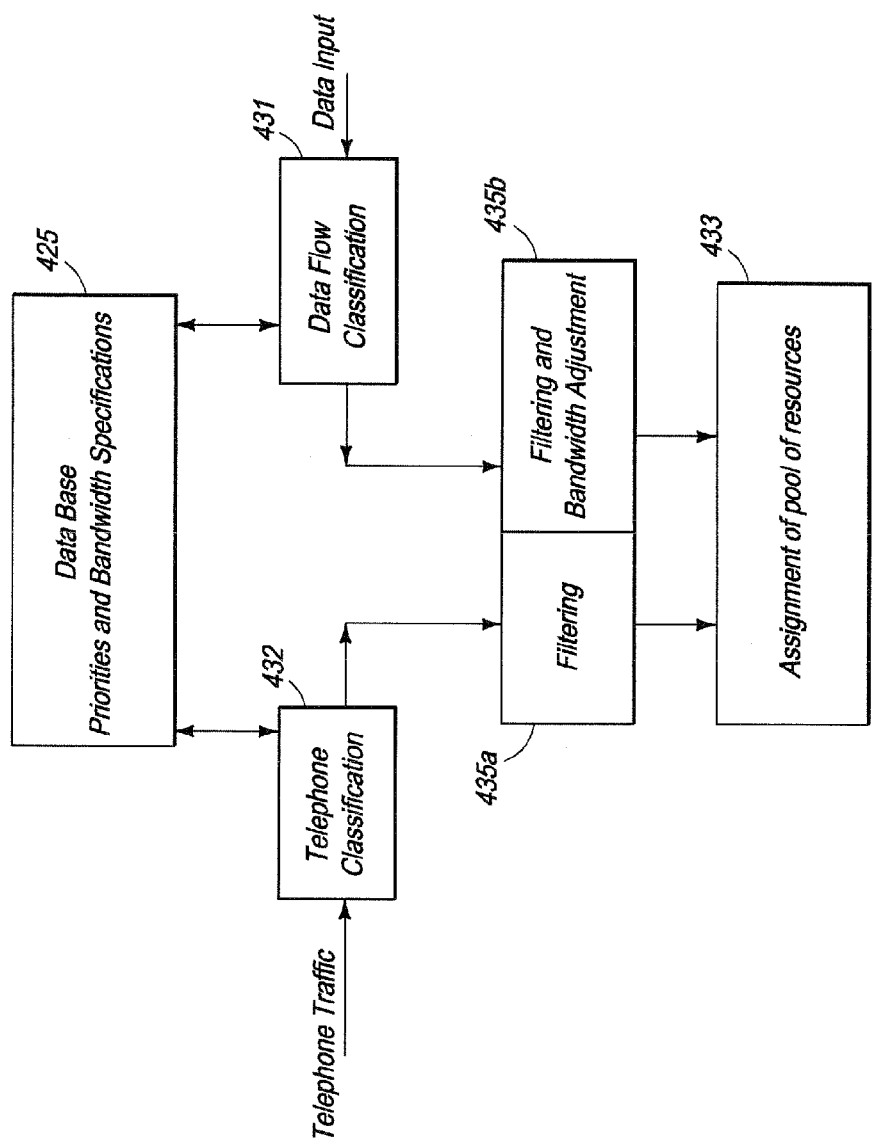
FIG. 4a is a block diagram showing the operations performed when handling calls.

By examining the content in the above fields in each packet, the packet can be assigned to a flow. As previously indicated each flow has associated bandwidth and priority specification. The system administrator must specify and store in a data base the specifications for each flow. Unassigned flows are assigned a set of default specifications. The classification program 232 obtains data from a data base 425 as shown in FIG. 4a.

The system operates based upon three different time periods or cycles. The periods are:
  Count period: (very short: for example 1/100th of a second)
  Police period: (short: for example 1/10th of a second).
  Adjust Bandwidth period: (somewhat longer: for example 1/5the of a second)

With respect to each flow or sub-flow, the actions indicated by blocks 233, 234 and 235 are performed. With respect to each flow or sub-flow, the packets arriving at the system are counted. That is, the Offered Bandwidth is determined for each flow and sub-flow in each count period (see block 233). The count of arriving packets provides the Offered Bandwidth.

At the end of each police period the amount of filtering required for each flow or sub-flow is determined and adjusted (see block 234). The filtering parameters established at the end of each police period are utilized for filtering during the next police period. Flows are filtered by dropping some of the packets from a flow. For example if the bandwidth of a flow must be reduced by ten percent, each tenth packet in a flow is dropped. It is noted that dropped packets will be detected by the higher level protocols such as by an IP (internet protocol) and the application will be notified in a conventional manner so that no data will in fact be lost. Mechanisms for handling dropped packets is included in all widely used protocols and the mechanisms for handling dropped packets forms no part of the present invention.

At the end of each Bandwidth Adjustment period, the bandwidth specifications for each flow and sub-flow are adjusted if required (see block 235). The bandwidth specifications established at the end of each adjustment period are used for the operations that take place during the next Bandwidth Adjustment period.

The systems 1 and 2 include dial-up modems on some of the DS0 lines. Thus, some times the DS0 are used for voice; however, when the bandwidth is necessary to carry higher priority data, the line can be switched to data lines. The communication resources are therefore pooled and used for either data or telephone traffic as the demand requires. The priority assignments for data and telephones utilize the same scale, thus, the priority of communication traffic can be shared and pooled for use by the highest priority task.

Figure 3A:
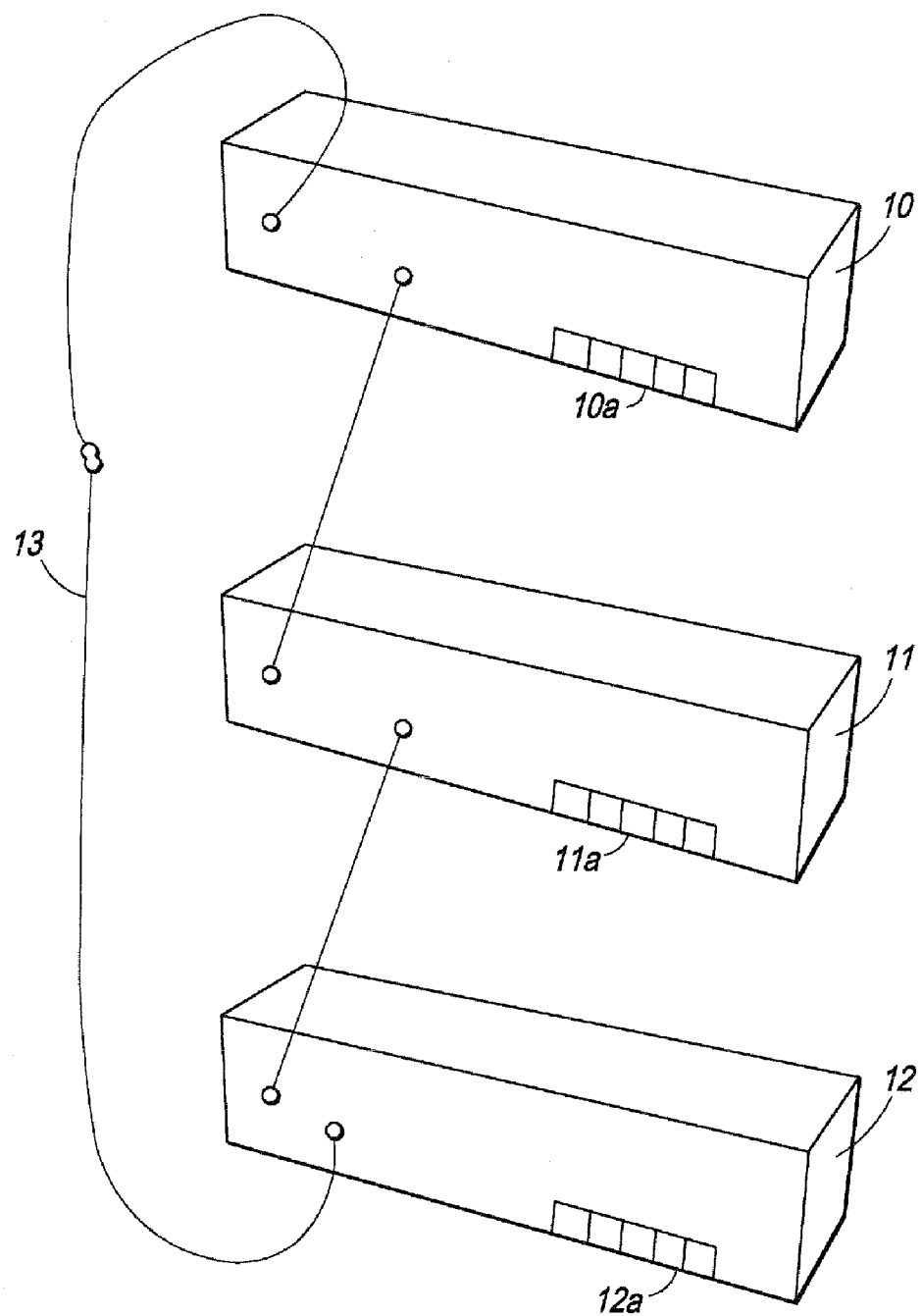
FIG. 3A is a drawing of the physical chassis that form a preferred embodiment of the invention.

The details of a system which performs the operations shown in FIG. 2 will now be described. As shown in FIG. 3a, the system consists of three stacked modules or chassis; however, It should be understood that the number of chassis in a stack is variable and can be selected to meet the requirements of specific application. A three-chassis stack will be used herein to illustrate the principles of the invention. As shown in FIG. 3a the modules or chassis 10, 11, and 12 are interconnected by a bus 13.

The bus 13 transmits packetized information between the chassis. The information transmitted between the chassis 10, 11 and 12 includes control information, packetized voice and packetized computer data. The details of the bus which interconnects the chassis is not part of the present invention. An example of such bus is described in co-pending patent application Ser. No. 60/098,297 filed Aug. 27, 1998. Application Ser. No. 60/098,297 filed Aug. 27, 1998 is incorporated herein in its entirety by reference.

Figure 3B:
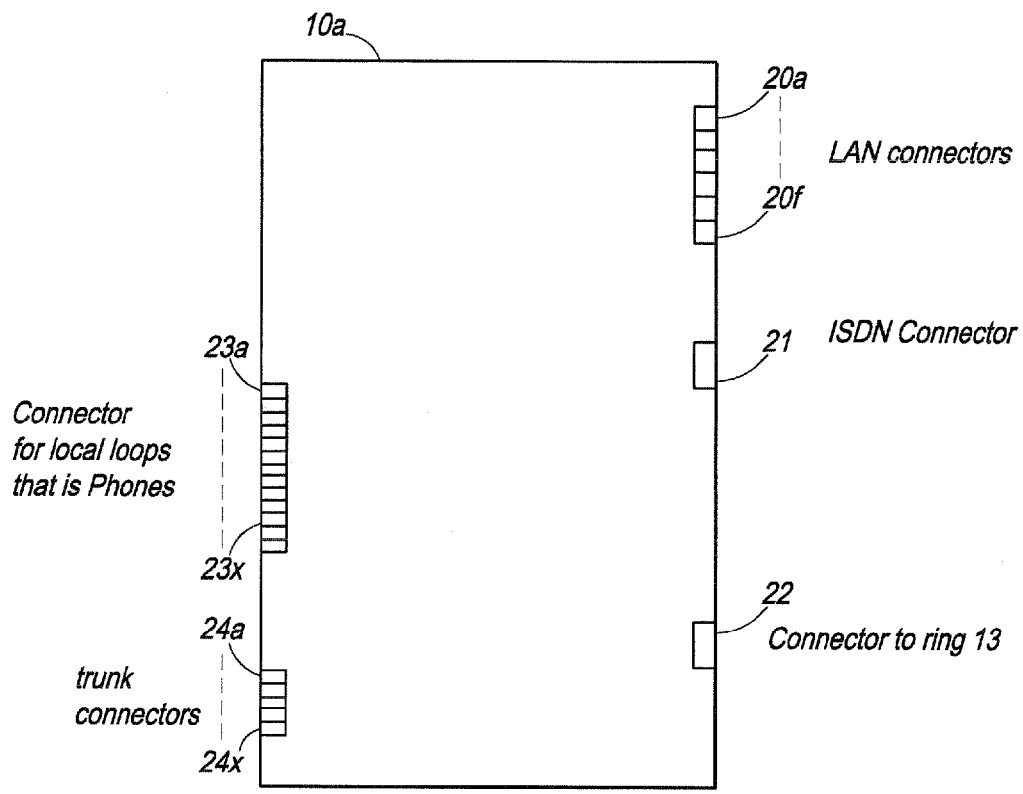
FIG. 3B shows one chassis and the ports on one chassis for connection to other lines or units.

FIG. 3B illustrates the connectors, which appear on each chassis 10, 11 and 12. There are six Ethernet ports 20a to 20f for connection for connection to Ethernet LAN ports such as LANs 1c1 to 1c4 shown in FIG. 1. There is a connector 21 for an ISDN (Integrated Services Digital Network) line. There is a connector 22 for the ring 13 that interconnects the chassis 10, 11 and 12. There are a number of connectors 23a to 23x for connection to local loops such as telephone handsets 1t1 and 1t4 and there are a number of connectors 24a to 24x for connection to telephone truck lines such as the T1 and DS0 lines shown in FIG. 1. The number of connectors for local loops, the number of connectors for trunk lines, the number of connectors for local loops, etc. is variable depending upon the capacity desired. There is a maximum number of each that can be accommodated on a single chassis. If more than the maximum number is needed an additional chassis is used.

Figure 3C:
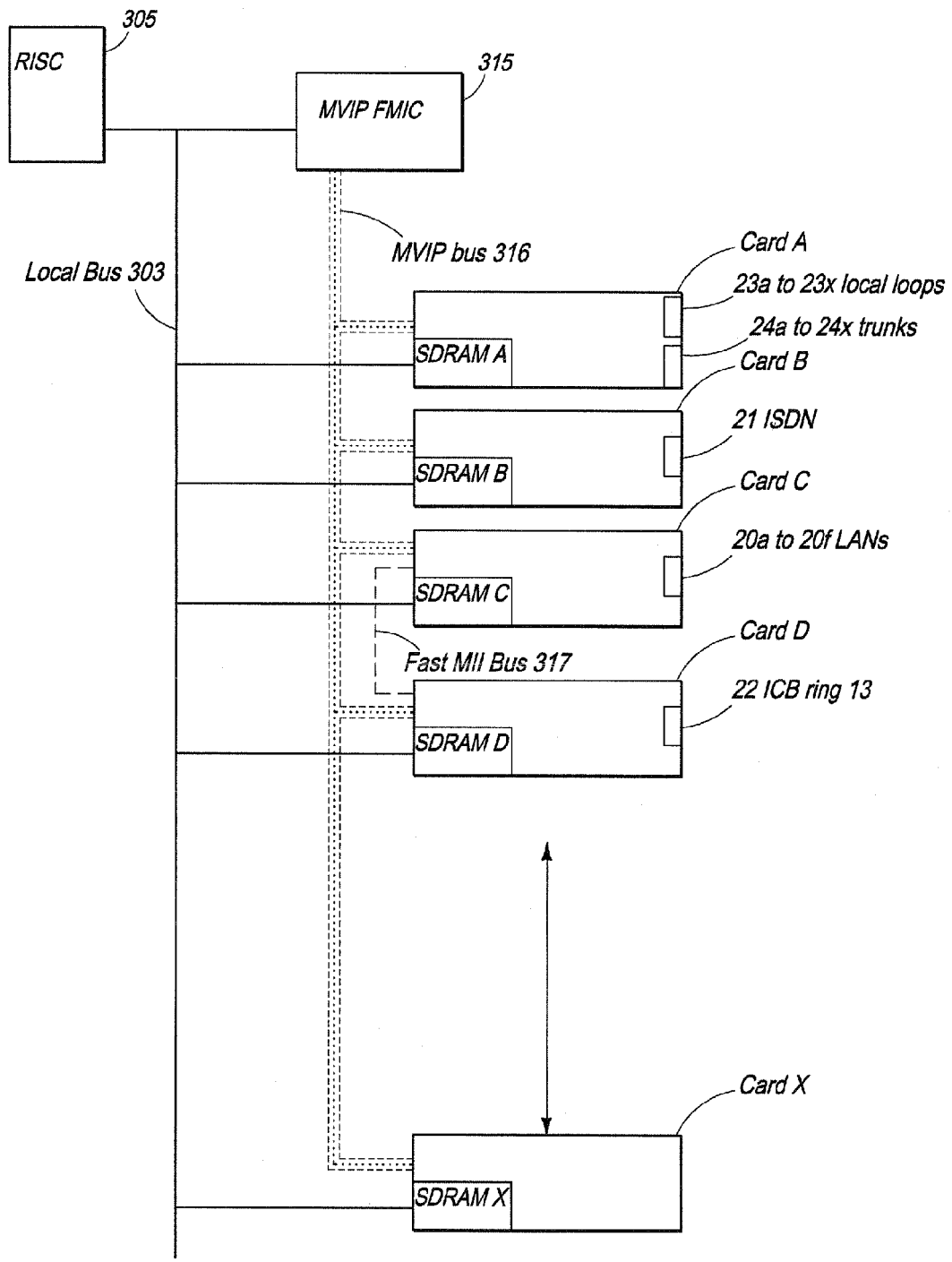
FIG. 3C is a diagram the bus arrangement which interconnect the various components on chassis.

FIG. 3C is an overall block diagram of chassis 10 which shows the RISC processor, the bus structure and the cards in the chassis. The physical structure of each chassis is conventional. The structure consists of a mother board (not explicitly shown) and plug in card designated as card A to card X. Each of the other chassis can be similar to chassis 10 or each of the chassis can have individualized characteristics by virtue of having a different set of plug in cards.

The main computational units in chassis 10 is a RISC microprocessor 305. The RISC microprocessor 305 can for example be one of the 64 bit microprocessors marketed by MIPS Corporation under the designation 46xx, 47xx or 50xx. In the specific embodiment show RISC processor 305 is a 150 Mhz IDT 4650 processor. Other models such as the 4750, 5050 or other versions may also be used. This processor family provides from 350–900 MIPS of processing power. A processor which can handle the expected traffic load is selected for each application. As described below chassis 10 also includes DSP processors and a second RISC processor mounted on the plug in cards.

There are three buses that interconnect the cards and various other units. There is a data and control bus 303, a MVIP bus 316 for synchronously transmitting packetized Voice and a Fast Asynchronous bus 317 for packetized data. The RISC Microprocessor 305 is connected to the other units by the data and the control bus 303 The main path for voice traffic is over MVIP bus 316. However, voice traffic can also be transmitted over data bus 303. As will be explained later a parallel to MVIP translator 352 (shown in FIG. 3D) transfers voice data from bus 303 to MVIP bus 316.

MVIP bus 316 is controlled by MVIP unit 315. MVIP bus 316 is a standard bus which conforms to the widely used Multi-Vendor Integrated Protocol. MVIP is an open, non-proprietary standard for manipulating telephone traffic in a computer environment. The MVIP FMIC (Flexible MVIP Interface Circuit) which controls bus 316 is a commercially available product.

Each of the cards A to X has memory thereon which can be addressed by RISC processor 305 via bus 303. The memory on cards A to X is designated SDRAM A to SDRAM X. This type of addressing is conventional. All of the cards have access to the bus 303 which allows the programs running in RISC processor 305 function to monitor the "health" and status of the cards as well as to perform normal supervisory functions such as code download, configuration download and statistics gathering for network management and call accounting purposes.

The bus 303 is similar to the PCI bus found in modern Personal Computers and the interface between the controller functions running in RISC processor 305 and the cards is done through register windows or small shared memory windows. In addition there are two other high-speed specialized buses for traffic switching and/or routing.

The 'MII' bus 317 and it is specialized for data traffic and the MVIP bus 316 is specialized for isosynchronous (voice) traffic. There are two ways in which voice traffic can be converted into data traffic and vice versa. One is through the PAC device 352 shown in FIG. 3D and one is by DSPs (Digital Signal Processors) located on cards A and B. The DSPs have the ability to sample the voice traffic and digitize it. This is similar to the functions performed by the PAC device 352.

Connectors 23a to 23x for local loop telephones are located on card A. Likewise connectors for trunks 24a to 245x are located on card A. The ISDN connector 21 is located on card B. the LAN connectors 20a to 20f are located on card C. Connector 22 for ICB ring 13 is located on card D.

The number of cards is a chassis is variable. A chassis could for example include nine, twelve or even fifty cards. FIG. 3C shows cards A,B,C, D and then card X to indicate the variable number of cards.

Figure 3D:
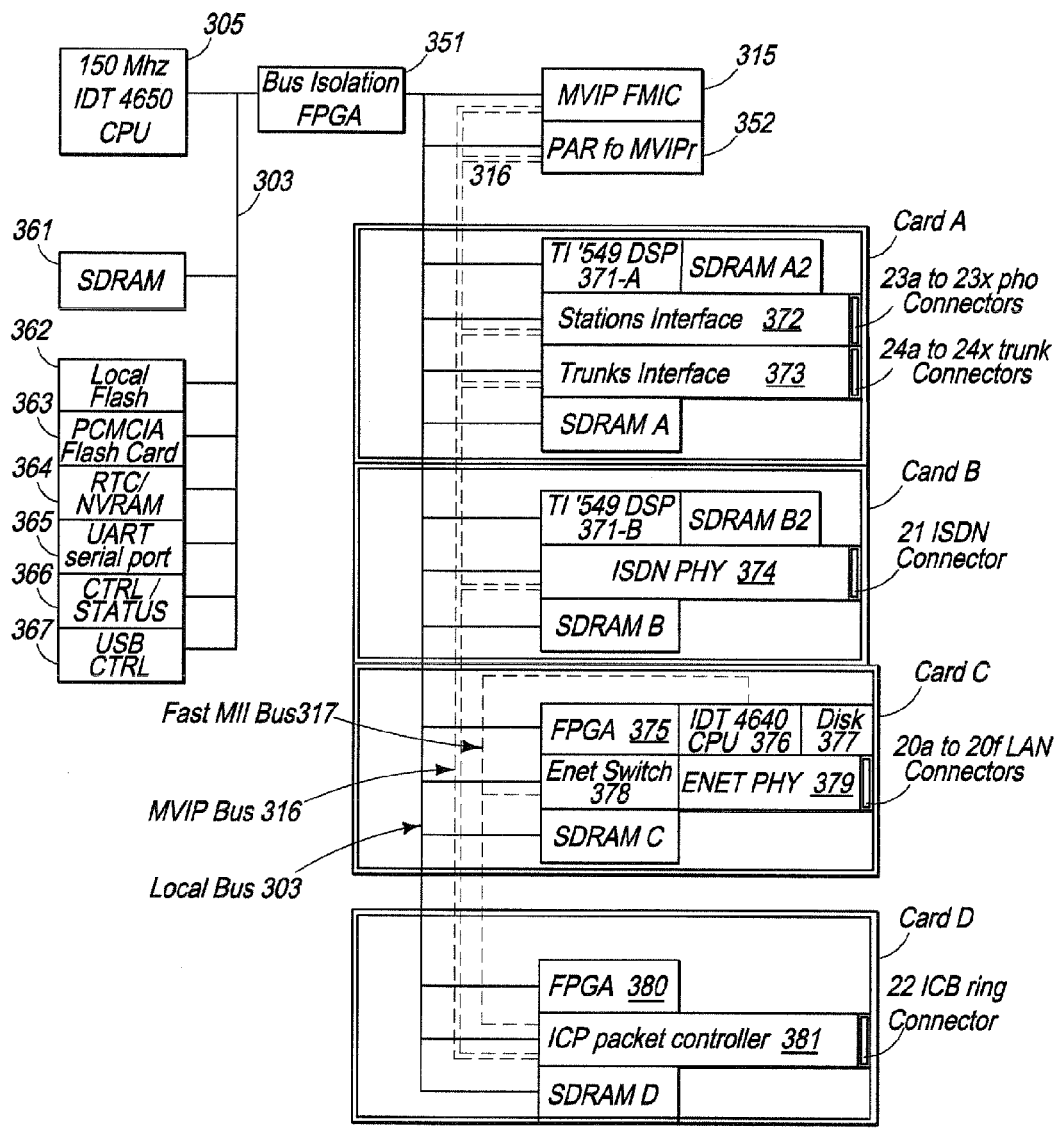
FIG. 3D is a block diagram of one chassis.
Figure 4B:
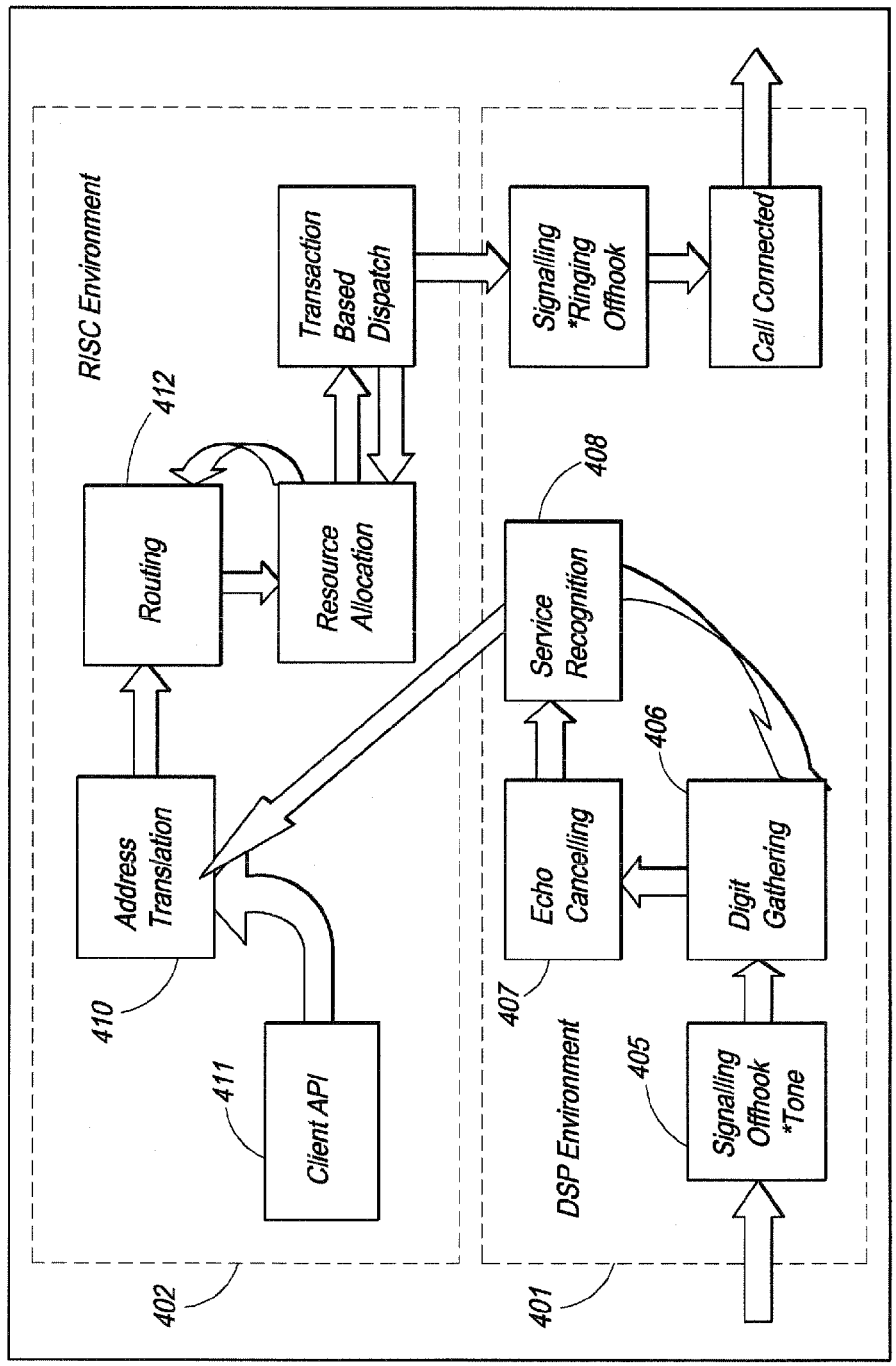
FIG. 4b is a block program flow diagram showing how a call is processed.

FIG. 3D shows in more detail additional components connected to RISC processor 305 and the components on cards A to D. The RISC processor 305 performs the overall control in the system. Processor 305 executes programs the flow diagrams of which are shown in FIGS. 2, 4a and 4b and the various other programs described herein. These programs are executed under the overall operation of a conventional operating system which allocates processing power on a time slice basis to tasks which have the highest priority. That is, time sensitive tasks are handled before non time sensitive tasks.

Attached to the RISC processor 305 is a DRAM memory SIMM 361 which provides up to 256 megabytes of random access memory. The RISC processor 305 has various conventional peripheral devices such as a local flash memory 362 for fast semi-permanent storage, PCMCIA Flash Card 363 for additional semi-permanent storage, a Real Time Clock (RTC) 364, an Interrupt Controller, a Serial Port (UART) 365, status lights and control switches 366, and a USB control port 367. All of these peripherals support the 'controller' functions provided by processor 305. Processor 305 may also have various other conventional peripheral devices such as terminals for administrative, operational and support purposes. In addition to handling overall control of the process taking place on cards a to x, the processor 305 also handles administrative support functions such as maintaining the data base which keeps track of the bandwidth specification for the various flows. This data can be maintained in a conventional data base such as those marketed by Oracle Corporation.

The chassis can include various types of plug in card. The cards in a chassis can include card A which is a combination analog trunk and analog station card, card B which is a single port ISDN BRI B card and card C which is an Ethernet switching card. The cards can be hot swappable and they can include cards for connection to T1/E1, ISDN PRI, ADSL, T3/E3 port and others.

A bus isolation unit 351 allows RISC processor 305 to communicate with units 361 to 367 using bus 303 at the same time that cards A to D communicate with each other using bus 303. Naturally this can not take place at a time that communication is in progress between one of the cards A to D and processor 305.

Unit 352 is connected to bus 303 and to MVIP bus 316. Under control of processor 305, unit 352 takes data words containing voice information from bus 303 and converts then to packets on MVIP bus 316. Such a conversion is used in situation where voice data is recorded (for example voice mail) in memory and it is desired to send such voice traffic out on one of the voice ports such as ports 23a to 23zx. Such parallel to MVIP units are conventional.

Card A includes a DSP 371-A with an associated memory SDRAM A2 which takes voice traffic from station interface unit 372 and truck interface unit 373 and digitizes it for transmission on MVIP bus 316. The DSP 371-A can for example be a Texas Instruments model 549 DSP. Card A also includes memory SDRAM-A for transferring data from RISC processor 305 to card A or for transferring information between card A and the other cards via bus 303.

Card B includes a DSP 371-B with an associated memory SDRAM B2 which takes voice and data traffic from ISDN interface unit 374 and either pacttizes it for transmission on MVIP bus 316 or which transmits data on bus 303. The DSP 371-B can for example be a Texas Instruments model 549 DSP. Card B also includes memory SDRAM-B for transferring data from RISC processor 305 to card B or for transferring information between card B and the other cards via bus 303.

Card C includes and Ethernet switch 378for routing packets that LANs 20 via Ethernet physical connector 379. Ethernet switch 378 has an associated Field Programmable gate array 375. Card C also includes a CPU 376 which handles bus 317 and which has an associated large disk drive 377. Disk drive 377 can be used for voice mail functions. Card C also includes memory SDRAM-C for transferring data from RISC processor 305 to card C or for transferring information between card C and the other cards via bus 303.

Card D provides a connection to the ICB ring 13 whereby data and voice traffic can be transferred from one chassis to another chassis via ring 13. Card D includes a packet controller 381 with an associated field programmable gate array 380. Card D also includes memory SDRAM-D for transferring data from RISC processor 305 to card D or for transferring information between card D and the other cards via bus 303.

There are four primary data transfers that occur:
1) MVIP resident transfers local to a single chassis, that is:
   a) from station to trunk, b) trunk to trunk, c) station to station or d)trunk to station
2) MVIP to Interconnect Bus, that is: station or trunk calls terminated on another chassis
3) CPU Bus to MVIP, that is: a) Ethernet to station or trunk, b) ISDN to station or trunk, or c) Microprocessor to station or trunk.

4) CPU Bus to Interconnect Bus, that is: CPU bus (from Ethernet, ISDN or microprocessor) to another chassis.

The system has a Unified Call Processing (UPC) program that allows integrated voice and data bandwidth allocation by quality of service. The unified call processing (UPC) function is performed by a program which executes the algorithms specified above and allocates pooled resources to each call in accordance with its priority. The Unified Call Processing (UPC) program supports multiple classes of service.

The UPC operates on 'calls' whether they are supporting voice traffic or encapsulated data traffic. A "call" is herein defined as having the following states. That is, the following states represent the Progression of a call:

1) signaled information and digit gathering
2) service recognition
3) address translation
4) routing
5) resource allocation There are two basic types of calls that are handled by the system: incoming calls and outgoing calls. The term 'incoming' means a call that originated outside of the system and is entering the system from a trunk interface of some type. The term 'outgoing' means a call that originated within the system, that is from a device directly attached or within the system. Incoming calls can be destined at either a local station (trunk to station) or passed on to another trunk (trunk to trunk) on the system (that is, routed through the system and terminated elsewhere) or targeted at a software termination point (an application within the system). Outgoing calls can be station to station or station to trunk as well as being from a virtual station, that is a software termination point within the system (such as the data router).

There are four types of endpoints for a call. That is, the end points can be two types of trunks and two types of stations. There are physical stations and physical trunks. Physical stations and physical trunks are true hardware interfaces that provide these services. There are also virtual stations and virtual trunks. Virtual interfaces are implemented in order to translate one service class to another. In the technical literature, what are herein referred to as virtual interfaces are sometimes referred to as 'gateways'. Virtual stations and virtual trunks are in reality the same construct, the only differentiation being that a virtual trunk is a gateway among different protocols, while a virtual station only has a single termination point. For example, virtual stations to implement voice mail service, while a virtual trunk can be used to implement a protocol encapsulation from the data router.

To summarize, the types of calls handled by the system are:

Incoming, that is: a) trunk to station and b) trunk to trunk
Outgoing, that is: a) station to station, and b) station to trunk
There are two types of stations, that is: a) physical and b) virtual
There are two types of trunks, that is: a) physical and b) virtual FIG. 4a illustrates the progression of calls in the system. Calls enter the system as either telephone calls or data calls. Block 432 represents telephone calls (voice calls) entering the system, and block 431 represents data calls entering the system. (Note program block 431 represents a combination of the programs 221–224, 231, 232, 233 and 234 which are shown in FIG. 2). When a telephone call enters the system (from either a local telephone port or from a WAN port), the normal signaled information and dialed digits are gathered.

In the service recognition phase a data base is interrogated to determine the priority assigned to the particular type of call by the system administrator. This is represented by block 425. Similar operations occur for new data flows that are detected on one of the Ethernet ports or which enter the system via one of the WAN ports.

Depending on the resources that are available and the priority of each call, the telephone calls are filtered as indicated by block 435a. That is, low priority calls are not assigned a DS0 circuit if there is other higher priority telephone or data traffic that requires additional bandwidth. As indicated by block 435b, the data flows are filtered as previously described. (note program block 435b is a combination of blocks 234 and 235).

As indicated by block 433, the resources of the system are assigned to the telephone or the data traffic as dictated by the priorities.

FIG. 4b illustrates Call Progression in the system. The DSP processors 371-A and 371-B perform the functions shown in block 401. The RISC processor 305 performs the functions shown in block 402. The RISC processor has programs that do conventional routing for data traffic and unified call control for voice traffic. The data router and unified call control software provides data flow or call setup, not actual traffic movement. Once a data call or voice call has been established, communication is directly between the cards involved and the traffic does not go through the RISC processor 305.

FIG. 4b shows the steps performed during the call setup progresses. As indicated by blocks 405 and 406, signaling and digit gathering is done within the DSPs 371A and 371-B. Each station and trunk interface has a signaling path preassigned to a DSP at system initialization time. The system has adequate I/O bandwidth for all stations to communicate signaling bandwidth to their dedicated DSP.

As indicated by block 407, echo cancellation is provided so that the system can accommodate Speech Recognition services. It is also noted that, echo cancellation is widely deployed in North America and is necessary to support end-to-end circuits which exceed 10 milliseconds of delay. The echo cancellation function requires DSP processor bandwidth and thus to conserve resources it can be limited to a portion of the total number of circuits supported as required.

Service Recognition block 408: Service Recognition is the stage in call progression where the service class is recognized by the content and order of the digits dialed by the user. The software consults a Digit Analysis Table to determine what service is being invoked by the user. The Digit Analysis Table can be in the same physical data base as data base 425 shown in FIG. 4a. The data base is stored in the memory attached to processor 305 and processor 305 stores and retrieves information from this data base in a conventional manner. Access Features are one of the services recognized during the service recognition phase of call progression. Access Features are a set of commands from the user to change the state of a call or access the station configuration. The Access Feature ID FSM (that is, the ID of programmed Finite State Machine which is responsible for Identifying the Access Feature) is used to identify which Access Feature is being invoked and from that determine the particular function to call for that Access Feature. Conventional finite state machines can be used to perform this function.

Address Translation block 410: Once the Service Recognition phase completes the call is sent to a Service Manager which understands the class of service being requested. In some instances, additional digits will be expected to fully qualify an address endpoint. Once the fully qualified address information is compiled, the system performs one of several 'address translation' operations, depending on the service.

When the service recognized, the address translation returns the address of the appropriate Service Manager. When the service is recognized as a local station to station call, the address translation will find the chassis and hardware address of the destination address. When the service is recognized as a remote call, routing will have to be completed to an appropriate trunk, before the chassis and hardware address can be obtained. Once this is complete, the address translation program will then provide the external addressing information. The external address information is based on both the trunk type selected and the ultimate destination of the call and includes dialing extensions. Such address translation is conventional.

The Client API block 411 is an interface that other services and programs in the system can use to establish calls. The originating endpoint is a virtual trunk or station, as described earlier. The Client API 401 has a parameter list (which is stored in memory) and which specifies the service type and destination address. Each address is translated, based on the service type, to account for such addressing schemes as: X.121, E.164 and NSAP. In addition, specific dialing extensions can be programmable for these service types, as expected.

The Client API interface is used by the Data Router to establish end to end phone calls in those cases that the Data Router requires additional trunk bandwidth and needs to establish additional WAN circuits to provide that bandwidth. That is the Client API includes a sub-program which dials into a dial up modem to provide additional bandwidth when required.

Call Routing block 412: Calls originating from a station interface may be a local station to station call, or a remote station to trunk call. Remote calls have to be routed to the Central Office (CO) through one of our trunk interfaces. If the call is a station to station call, routing is done as follows: The called party number may be a hunt group number or a direct station number. If the number is a hunt group, it is treated the same way as if it was a incoming hunt group call, and apply the hunt group routing. If the number is a direct station number, then it is determined if it is a station in the same chassis, or a different chassis. If the call destination is on a different chassis', the call is switched over the interconnect bus to the destination chassis. Note that the hook status of the destination station may or may not be checked prior to this step, depending on implementation considerations. In any case, a busy tone is used to indicate endpoint unavailability and a reorder tone will be used to indicate resource unavailability.

As is conventional, preceding the called party number by a predetermined number, usually '9' disables local PBX routing functions. Calls leaving the system can be directed to a private line destined to another PBX or the Central Office. Calls destined to a private line are dialed with a special preceding number, usually '8'. When calls leave the system to the central office, the call is routed to outgoing trunks. The specific trunk selected is determined by consulting a trunk group table.

Incoming Calls: Incoming calls enter the system through a trunk interface, that is through one of the ports 24a to 24x. They may be destined to a station chassis or another trunk interface. The called party may be: A direct station number (including DID), a virtual station or virtual trunk number (including those connections setup by the Data Router via the Client API) an ACD number, or a Hunt number).

Calls which are DID, are routed directly to the station, over the MVIP bus 316 or the interconnect bus depending on the physical location of the station. A multi-stage switch model is used to progress calls to foreign chassis'.

Implementation of Pooling Mechanism: The system utilizes three mechanisms that allow dynamic pooling of the DS0 units to achieve higher statistical multiplexing on integrated voice and data platforms. The mechanisms are:

1) Providing homogeneous access to DS0 trunk resource allocation between voice and data traffic, resulting in a larger resource pool.

2) Partially normalizing the class of service characteristics of voice and data traffic, such that the requests for resources from each service can be scheduled from a single, larger pool of DS0s.

3) Maintaining multiple qualities of service for services drawing from a single resource pool.

Thus, higher statistical multiplexing is achieved by increasing the size of the DS0 pool, improving the mechanisms to determine the available multiplexing and by dynamically adjusting the multiplexing.

Consider the 'N' inputs and 'M' outputs which the system has. It is noted that 'N' is greater than 'M'. In the system described herein, 'N' are the Local ports (of either type) and 'M' are the WAN ports (actually the DS0s on the WAN ports). The present system provides a higher number of 'M' (the WAN ports) by combining the here-to-for separate resource pools into a single multiplexing resource pool.

There are three basic types of ports;

a) Local Data Ports 20 (Ethernet)

b) Local Telephony Ports 23 (Analog Station)

c) Wide Area Network Ports 24 and 31 (ISDN, Analog Trunk, T1/E1)

The Wide Area Network ports 24 and 31 are the only ones concerned with the pooling mechanisms described below, they represent the DS0 units which are pooled and allocated by these mechanisms.

WAN ports are combinations of DS0s. The breakdown is;

| | |
|---|---|
| Analog trunks | == 1 DSO |
| ISDN BRI | == 2 DSO |
| T1 | == 24 DSO |
| E1 | == 32 DSO |

There are two basic types of communication traffic flowing through the system; a) Data Traffic and b) Telephony Traffic. Data Traffic is packetized and is sent asynchronously. Telephony traffic is a continuous stream and is sent synchronously.

Both types of traffic share the Wide Area Network Ports 24 and 31. In order to facilitate sharing, traffic is classified, at the source, into 'flows' and traffic is assigned a bandwidth specification.

Telephony traffic: Always uses an integral number of DS0s worth of bandwidth with fixed delay and delay variation.

Data traffic: The system classifies data traffic into flows based on VLAN and the {source, destination} IP address and {source, destination} layer four protocol port pair. Based on this information the system looks up a bandwidth 'record' in database 425. The offered data traffic must then be 'normalized' to the 'available' bandwidth through the mechanisms discussed below.

Commonly, voice and data traffic are carried on separate groups of DS0 units. But this reduces the multiplexing efficiency. For example consider a classical system with the following voice and data service characteristics;

Voice input ports; VI1 . . . VI6
Voice output ports;VO1 . . . VO2
Data input ports; DI1 . . . DI8
Data output ports; DO1 . . . DO4

In a system that has eight Ethernet ports, six analog telephone handset ports and six WAN ports, (two for voice, four for data). A situation can occur where all the voice wan ports are busy, the data wan ports are idle and another potential user of voice services is blocked because there are no wan ports are available. A similar situation can occur for data services.

With the present invention the WAN ports are 'pooled', that is, shared between the voice and data services, making all six WAN ports available to either service, as required.

Partially normalizes the characteristics of data traffic: The present invention will increase the total number of WAN ports available, as outlined above, and provide multiple qualities of service by 'taming' the properties of data traffic. With the present invention the system creates several 'virtual' multiplexing 'groups' where the values on 'N' and 'M' are being manipulated to create different multiplexing 'degrees'. For example, in a situation where there are 8 inputs and 4 outputs, the system we can create two groups, one with 2 inputs and 2 outputs and one with 6 inputs and 2 outputs. By doing this the system changes the blocking factors for each group, allowing the system to define multiple qualities of service. These are the resource pools. The system uses the policing and filtering programs represented by block 435 to enforce these qualities of service.

The programs discussed above and shown in block diagram form in FIG. 2 are implemented as programming modules in RISC processor 305. There are two fundamental types of communications traffic in the system the system;

a) synchronous bit streams which carry telephone voice traffic, and b) asynchronous packetized data from LAN traffic.

Traffic is characterized as having the following characteristics (these characteristics are referred to as the 'traffic contract' for a 'flow');

a) guaranteed bandwidth b) delay c) delay variance

The programs (or subroutines) represented by blocks 232 to 235 in FIG. 3 adapt the available system resources and deliver the requested 'traffic contract'. The functions include:

Filtering: Filtering removes unwanted data, either present as unwanted flows, or data within a flow. The effect is to reduce the bandwidth required to support a higher priority flow.

Bandwidth adjustment: The sub routine represented by block 235 performs a separate, orthogonal function: It increases or decreases the available output bandwidth to match the offered load. That is, it dynamically adds or removes additional bandwidth (on the WAN ports) to account for increases or decreases in the real time bandwidth required after the Filtering has been applied to the input traffic stream. This is done by use of a dial up modem which provides addition bandwidth for data traffic. Alternatively, if a particular DS0 is not being used for data traffic, or if there are voice calls with higher priority than pending data calls, a program (i.e. block 433) can change the use of a DS0 from voice to data or vice versa.

The Filtering program represented by block 234: Flows are identified in real time as data traffic arrives from the LANs 1c1 to 1c4. The {source, destination} IP address as well as the {source, destination} TCP or UDP port numbers are used to identify flows by the classification program 232. Once a flow has been identified, the corresponding bandwidth specification is looked up database 425. Not all flows will have pre-assigned a bandwidth specification. Such flows will use a default specification. In general, only those flows associated with the most mission critical applications will have a bandwidth specification in the database. However, many "flows" can share a given interface. These "extra" flows will use the "available" bandwidth on the interface on a real time basis until they terminally oversubscribe the interface. At that point, the filtering program 234 will remove the "extra" flows to ensure that the high priority configured flows receive the bandwidth they require.

The Bandwidth Adjustment program 235: The Bandwidth Adjustment program 235 modifies the output bandwidth available to meet the offered load, rather than attempting to reduce the offered load. It performs this function by using conventional dial-on-demand technology to establish or remove additional circuits for the interface to use, thus adjusting in real time the total amount of bandwidth available.

The following is a description of how multiple qualities of service can be provided between systems 1 and 2. If one has N sources of possible traffic and M possible destinations for that traffic, where N is strictly greater than M, then if all N sources are busy some amount of blocking (denial of service) will occur. Given a fair distribution of service requests and durations, the amount of time in which blocking will occur can be expressed as: (N−M)/N. Since the chance that any source N will be active at any given time is effectively random, the closer the ratio M/N is to one, the less the chance that an instance of N 'Sn', will be blocked when it becomes active.

Sources of traffic are divided into sets: S1, S2, . . . Sn where the sum of all the members of each set equals N. We have further divided our possible destinations into sets: D1, D2, . . . Dn where the sum of all members of each set equals M. Any set of 'S' as 'Si' and any set of 'D' is represented as 'Di'. For the set relationships between Si and Di such that for any given {Si, Di} tuple, the following equations hold true (where'(=' has been used for 'belongs to'):

0. {D1, D2, . . . Dn} (=M and {S1, S2, . . . Sn} (=N

| | |
|---|---|
| 1. Si >= Di | For particular sets Si, a corresponding set Di may be created for which this holds true. |
| 2. Di/Si > M/N | For a particular definition of Dn/Sn. |

The fact that one can create the definitions found in '1' and '2' allows the system to create classes of services which have significantly different properties then the default behavior of the systems service prior to this definition. For example, one can ensure for two sets 'Di' and 'Si', the ratio Dn/Sn can be one, indicating no blocking will occur.

The following technique is used to Improve Shared Resource Multiplexing. First, the system quantifies both data and tele communication traffic in a normalized way. With telecommunications traffic each voice circuit will take up to one DS0, (less if it has been compressed). To handle the case in which compression is being utilized (as described later) a 'partial' DS0 can be defined as a flow. Sub-channel addressing therefore exists such that one or more 'partial' DS0 may be assigned to a given flow.

For data communications traffic, in addition to having to support sub-channel addressing for 'partial' DS0 flows, the system must support 'multiple' DS0 flows.

The fundamental properties of a flow are defined as follows:

BSi=source bandwidth in kilobits per second

Bdi=destination bandwidth in kilobits per second

CEi=compression engine 701

BEi=bandwidth allocation engine 702

FEi=filtering engine 703

FSi=A Flow Switching instance

And Where:

$$FSi=(BSi+BDi)$$

Which defines a flow path from an arbitrary set of sources, of some bandwidth, to an arbitrary set of destinations of equal bandwidth.

However, we know that for any set of sources N, there will be a smaller number of destinations M (except for the class of service distinction algorithm we discussed earlier) such that there is a mismatch or 'blocking' state will occur. The following describes how the system allocates resources to alleviate or eliminate this blocking condition and achieve the desired state of M=N.

First, a compression program (as discussed later) can be used so that it can be assigned to account for the mismatch between the requested source bandwidth and the available destination bandwidth such that:

$$Bs*CEi=Bd$$

We allow the definition of additional bandwidth which can be assigned to Bd such that:

$$Bd'=(Bd+Di) \text{ and}$$

$$Bs=Bd'$$

For bursty traffic sources the queuing programs 221 to 224 can be used to account for the mismatch between requested source bandwidth and the available destination bandwidth such that: $Bs*QEi=Bd$ Finally, for resource starved conditions, filtering program 234 can be applied such that some portion of the traffic is dropped in an expected and useful manner, such that:

$$Bs*FEi=Bd$$

Thus, we define categorize flows as described above, and by establishing policies on a flow, or class of service basis, we achieve significantly higher multiplexing.

It is noted that the system can utilize other mechanisms to realize a greater benefit by capitalizing on the available bandwidth created through the 'pooling' techniques for other services (Frame Relay, PPP). For example, mechanisms such as the following can be used:

1) A Signaling mechanism for bandwidth adjustment between two cooperating systems using frame relay.

2) A signaling mechanism for bandwidth adjustment between two cooperating systems using the point-to-point protocol.

3) A signaling mechanism for bandwidth adjustment between two cooperating systems using sub-rate channeling.

Once the bandwidth is made available through the pooling techniques (effectively as unused DS0's), this bandwidth is available to be used for standard telephony traffic (phone calls), modem sessions or ISDN sessions. In order to realize these benefits for a Frame Relay service or PPP service, then additional techniques need to be created.

Voice traffic as described above utilizes 64K. The system could include a compression program which would compress voice traffic into a partial DS0. A compression program could be added to the system to provides a function similar to that of the Filtering program so as to reduce the total offered traffic load on the interface. This could be achieved by use of a data compression mechanism which runs in real time on the offered traffic flow. This is an analogous function to that of the Filtering program in so far as it modifies the offered traffic load to meet the available interface bandwidth. Finally, sub-rate channeling signaling mechanism can be used to achieve even higher pooling through a separate, additional mechanism. It should be understood that the terms data traffic as used herein applies equally to other types of data traffic such a video or PC-teelphony.

While the invention has been described with reference to a preferred embodiment thereof, various changes in form and design can be made without departing from the spirit and scope of the invention. The scope of the invention is limited only by the appended claims.

I claim:

1. A system for interconnecting telephones and computers, said system including
    trunk interconnection resources that can be used for either computer data traffic or telephone traffic, said trunk interconnection resources providing a total amount of bandwidth that can be allocated to said computer data traffic or to said telephone traffic,
    data traffic generating devices for generating data traffic,
    said data traffic requiring bandwidth and being normalized with respect to specified classes of service,
    voice traffic generating devices for generating voice traffic,
    said voice traffic requiring bandwidth and having specified classes of service,
    means for dynamically adjusting the amount of said total bandwidth allocated to said data traffic and to said voice traffic in a multiplexed data stream depending upon the class of service of said data traffic and said voice traffic.

2. A system for interconnecting telephones and computers, said system including a pool of trunk interconnection resources that can be used for either computer data traffic or telephone traffic, said interconnection devices providing a total amount of bandwidth,
    data traffic generating devices for generating data traffic,
    said data traffic requiring an amount of bandwidth and being normalized with respect to specified classes of service,
    voice traffic generating devices for generating voice traffic,
    said voice traffic requiring an amount of bandwidth and having specified classes of service,
    means for dynamically managing said total amount of bandwidth for multiple streams of data traffic and for multiple streams of voice traffic drawing from said pool of trunk interconnection resources in a multiplexed data stream based upon the class of service of said streams of data traffic and said streams of voice traffic.

* * * * *